(12) United States Patent
Hollander et al.

(10) Patent No.: US 6,267,626 B1
(45) Date of Patent: Jul. 31, 2001

(54) CONNECTOR FOR THERMOELECTRIC DEVICES

(75) Inventors: Milton Bernard Hollander; William Earl McKinley, both of Stamford; Russell Stewart, Fairfield, all of CT (US)

(73) Assignee: Omega Engineering, Inc., Stamford, CT (US)

(*) Notice: Subject to any disclaimer, the term of this patent is extended or adjusted under 35 U.S.C. 154(b) by 0 days.

(21) Appl. No.: 09/245,218

(22) Filed: Feb. 5, 1999

Related U.S. Application Data

(63) Continuation-in-part of application No. 09/131,411, filed on Aug. 10, 1998, now Pat. No. 5,984,729, and a continuation-in-part of application No. 09/039,496, filed on Mar. 16, 1998, now Pat. No. 5,997,355, and a continuation-in-part of application No. 08/710,683, filed on Sep. 24, 1996, now Pat. No. 5,910,030, said application No. 09/131,411, is a division of application No. 08/751,594, filed on Nov. 18, 1996, now Pat. No. 5,833,496, said application No. 09/039,496, is a division of application No. 08/605,607, filed on Feb. 22, 1996, now abandoned.

(51) Int. Cl.$^7$ .................................................. H01R 13/66
(52) U.S. Cl. ............................................................ 439/620
(58) Field of Search .................................... 439/620, 696, 439/913; 333/181–186

(56) References Cited

U.S. PATENT DOCUMENTS

| | | | |
|---|---|---|---|
| 4,847,730 | * 7/1989 | Konno et al. ........................ 333/181 |
| 5,213,522 | * 5/1993 | Kojima ................................. 439/620 |
| 5,219,305 | * 6/1993 | Kawaguchi et al. ................. 439/620 |
| 5,246,387 | * 9/1993 | Liebich et al. ....................... 439/620 |
| 5,370,555 | * 12/1994 | Smoravek ............................ 439/620 |
| 5,413,504 | * 5/1995 | Kloecker et al. .................... 439/620 |
| 5,492,482 | * 2/1996 | Lockman et al. .................... 439/913 |
| 5,551,893 | * 9/1996 | Johnson ............................... 439/620 |
| 5,842,888 | * 12/1998 | Belopolsky .......................... 439/620 |
| 6,045,406 | * 4/2000 | Cortes .................................. 439/620 |

* cited by examiner

Primary Examiner—Paula Bradley
Assistant Examiner—Tho D. Ta
(74) Attorney, Agent, or Firm—William A. Drucker

(57) ABSTRACT

An electrical connector, for use in conjunction with or forming part of, a thermocouple probe has a body of electrically Insulating material, preferably formed by moulding, a plurality of apertured blocks of ferrite material within the body, and a corresponding plurality of elongate metallic conductors within the body and positioned through and projecting from a respective block of ferrite material. In a preferred form, the metallic conductors are made of metals of different alloy designation, as appropriate to the metal alloys used in the associated thermocouple probe. Further, the metallic conductors are advantageously made of different cross-sectional dimensions and/or different cross-sectional shape, such that the connector may be mated with a corresponding connector in only one manner of plug and socket. A method for making such an electrical connector includes steps of positioning each conductor through a respective block of ferrite material to form a respective assembly, and forming a body of electrically insulating material about the assemblies by moulding.

14 Claims, 6 Drawing Sheets

CONNECTOR FOR THERMOELECTRIC DEVICES

RELATED APPLICATIONS

This Application is a continuation-in-part of U.S patent applications: Ser. No. 09/039,496 filed Mar. 16, 1998, now U.S. Pat. No. 5,997,355, which is a division of abandoned application Ser. No. 08/605,607 filed Feb. 22, 1996; Ser. No. 08/710,683 filed Sep. 24, 1996 U.S. Pat. No. 5,910,030; and Ser. No. 09/131,411 filed Aug. 10, 1998, now U.S. Pat. No. 5,984,729, which is a division of Ser. No. 08/751,594 filed Nov. 18, 1996, which is now U.S. Pat. No. 5,833,496 issued Nov. 10, 1998.

This disclosure contains no night to any inventions made under federally sponsored research and development.

BACKGROUND OF THE INVENTION

Field of the Invention

This invention relates generally to connectors, whether single conductor or multiple conductor, and whether intended for use as single connector items, e.g. for making a separable connection to a piece of electronic apparatus, or as a part or parts of a multiple-part line connector assembly, e.g. male and female interconnecting plug and socket items, and particularly thermoelectric devices such as the couple probes, thermistors, and RTD's particularly hand-held such devices, which may be connected by a link such as a cable.

More specifically, the invention relates to connectors, which provide for suppression of radiated and/or conducted electromagnetic emissions, which would be detrimental to proper use of apparatus in which the connector is included. In particular the invention is applicable to fields of use wherein there is necessity for including an electrical or electronic circuit or device having a relatively low signal level, which might be adversely affected by such stray emissions, for example thermocouple sensor circuits.

SUMMARY OF THE INVENTION

It is known that electrical signals carried by connectors, or adjacent apparatus, may be subject to electromagnetic interference as the result of induced signals picked up from the electromagnetic radiation of adjacent electrical equipment. Such interference results from the leads, to the connector or within the connector, acting as an antenna, which senses stray electromagnetic radiation.

Various efforts have been made to avoid or suppress the result of such interference, but such efforts have been found to be inconvenient and/or expensive to implement or both. For example, it has been found in the past that interference from stray signals can be avoided by encapsulating leads in sheaths of RFI (radio frequency interference shielding) material, or by determining the strength of nearby stray signal fields and then moving all such nearby sources to a physical distance from the leads that has been calculated to prevent possibility of undesired signals being picked up by electromagnetic induction, It can be seen, readily, that such preventive methods and techniques are indeed costly and inconvenient. Other attempts to reduce or avoid interference from stray signals have involved the use of ferrite cores. Hitherto such uses have in some cases required additional circuit elements, such as insertion of a jumper cable having a permanently included ferrite core, in series with the main conductors in the circuit. Again, it is known to use ferrite beads mounted conveniently on circuit boards or molded into connectors used with computer monitors.

It is established practice, in industries that make use of thermocouple sensors to couple the sensor into a related electrical circuit by means of an electrical connector. When for example thermocouples are connected to instruments such as panel meters, controllers and transmitters, the input signal from the sensor or transducer usually travels substantial distances along fine gauge electrically conductive wire leads. The length and nature of such leads and the environment in which they must function often create conditions that favour occurrence of stray emissions. In many cases, the leads or signal wires from a sensor or thermocouple are first attached, for convenience, to an electrical connector, for coupling to an instrument or the like. As soon as the conductors of the connector are electrically coupled to the circuit, stray EMI emissions may be conducted into the circuit. Of particular importance are thermocouple connectors, which are particularly susceptible because of the long lead conductive path of the conductors themselves and the high input impedance of the instrumentation.

The term 'ferrite' as commonly understood in the electronics field, denotes a particulate material having one or more oxides of iron in particulate form in a carrier. This usage of the term 'ferrite' is to be distinguished from the usual dictionary definition, which is a generic name for a number of oxides of iron. In this specification, the term 'ferrite' is to be understood as including within its scope any suitable material having an absorption and/or shielding effect as concerns electromagnetic waves which may be emitted at or adjacent to a zone of completion of an electrical circuit, Known ferrite elements consist of ferrite material sintered into a convenient shape. Other known 'ferrite' materials for the suppression of electromagnetic interference are nickel-zinc compositions and manganese-zinc materials, of different compositions to permit selection of an optimum type for a given application; pressed parts, components, and powders are known.

OBJECTS OF THE INVENTION

Accordingly it is an object of this invention to provide means associated with an electrical connector that is capable of filtering stray signals, which may be induced in the lead or leads of a connector.

It is another object of this invention to provide apparatus which eliminates the effects of undesired stray signals in circuits which include a connector or connectors, that is uncomplicated in design, and that is relatively simple and inexpensive to produce.

it is still another object of this invention to provide means associated with an electrical connector, for eliminating the effects of undesired stray signals in the circuit or circuits in which the connector is included, that is easily adaptable to single lead or multi-lead connectors.

Another and further object of this invention is to provide means associated with an electrical connector for eliminating the effects of undesired stray signals in its circuit or circuits, that can be manufactured easily in various configurations to accommodate differing circuit requirements.

And yet another and further objective of this invention is to provide means in an electrical connector, for the elimination of the effects of undesired stray signals in its circuit or circuits, which can be readily changed and substituted in the connector by other such means of a different rating or effectiveness according to requirement.

It has been found that so-called 'soft' ferrite elements, as they are known in this art, when properly included in an electrical circuit, act as an electromagnetic 'sponge' to absorb and dissipate the unwanted electromagnetic wave energy of the conductor or conductors with which the ferrite element is associated.

DETAILED DESCRIPTION OF THE PREFERRED EMBODIMENTS

Figure 1:
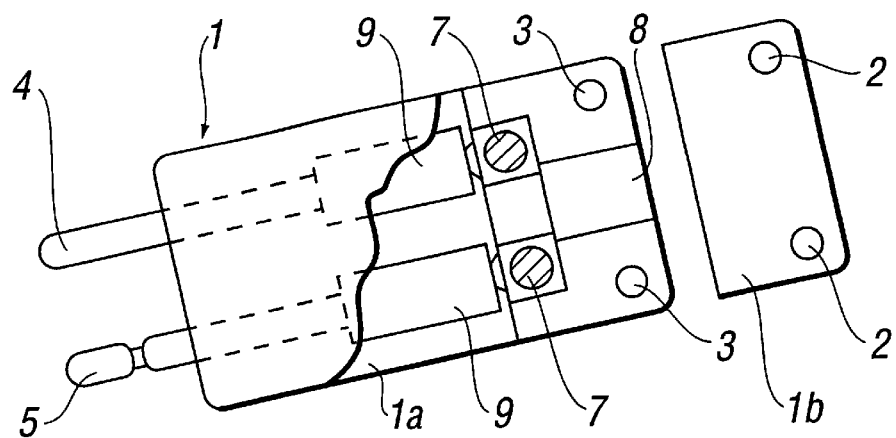
FIG. 1 is a plan view, with part shown in separated condition, of a two-pin male connector plug for use in connecting a thermoelectric device such as a thermocouple probe.

In FIG. 1 there is shown a male connector for a thermoelectric device such as a thermocouple probe. The connector has a body 1, made of an insulating material, part of which is shown cut away to reveal internal details. The body consists of a main body portion 1a and a separable cover portion 1b, which can be removed for access to wiring, and is securable in position by metal screws (not shown) engaged through holes 2 and engaged into respective threaded holes 3 in the body portion 1a.

The boy portion 1a has integrally moulded into it a pair of metal connector prongs 4 and 5 each having at its inner end a terminal plate with a metal screw 7 for the securing of a respective wire of a connector lead (not shown) which is passed through a recess 8 in the body portion 1a and is clamped in position when the metal screws in the holes 2 are tightened.

Each of the metal prongs 4 and 5 is engaged through a cylindrical hole in a respective parallelpipedal block 9 of ferrite material, said blocks being likewise moulded integrally within the body portion 1a.

The connector prongs 4 and 5 are made of respectively different diameters so that the connector can be engaged in only one way into an associated connector, or instrument, having correspondingly sized female sockets.

Figure 1A:
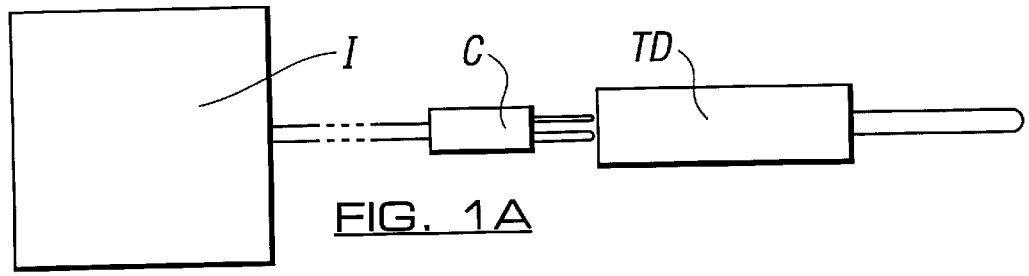
FIG. 1A is a schematic to show an example of application of the connector plug of FIG. 1 to provide a connection between an instrument and a thermoelectric device.

FIG. 1A shows a manner of use of male connector C of FIG. 1 in providing a connection between an instrument 1 and a thermoelectric device TD, such as a thermocouple probe.

Figure 2:
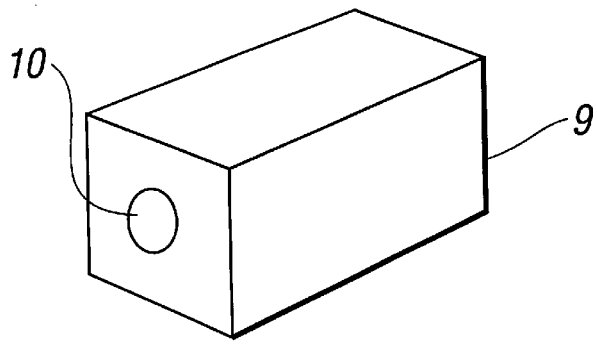
FIG. 2 is an isometric perspective elevation of a ferrite block as incorporated in the connector plug of FIG. 1, but shown to a larger scale.

FIG. 2 shows in perspective and to an enlarged scale, one of the blocks 9, wherein there is a cylindrical hole 10 of a suitable diameter to permit the respective connector prong to be entered as a sliding file prior to incorporation into the body portion 1a.

Figure 3:
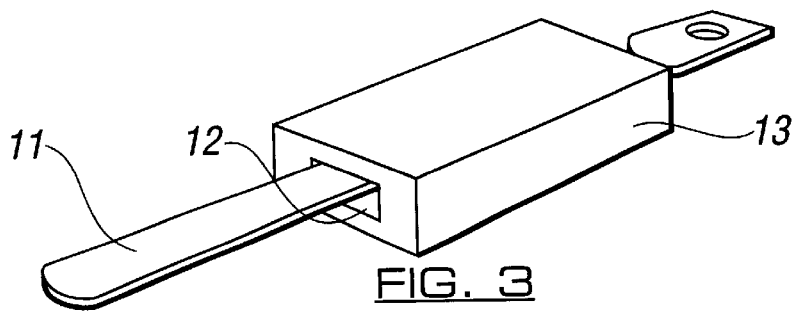
FIG. 3 is an isometric perspective elevation of another embodiment of ferrite block and associated metal prong for inclusion in a body portion as seen in FIG. 1.

Referring now to FIG. 3 there is shown a single connector prong block assembly which differs from those described with reference to FIGS. 1 and 2 in that the metal connector prong 11 is of flattened cross-section and is engaged as a sliding fit into a hole 12 of similar rectangular cross-section in the ferrite block 13 which is of comparatively thinner cross-section and is comparatively elongated as compared with the blocks 9 of FIGS. 1 and 2. Only a single connector prong is shown in FIG. 3, but in use there would be two prongs of relatively different width and/or thickness each engaged as a sliding fit through a hole 12 of corresponding dimensions and cross-section. In other respects the connector, as a whole (not shown) would have a main body portion and a separable cover portion as shown in FIGS. 1 and 2. For use in relation to a thermocouple probe, the metal connector prongs 4 and 5 (FIGS. 1 and 2) and the corresponding prongs 11 of FIG. 3, would be for example respectively of Chromel and Alumel or other suitable associated pairs of metal, as well known in the thermocouple art.

Figure 4:
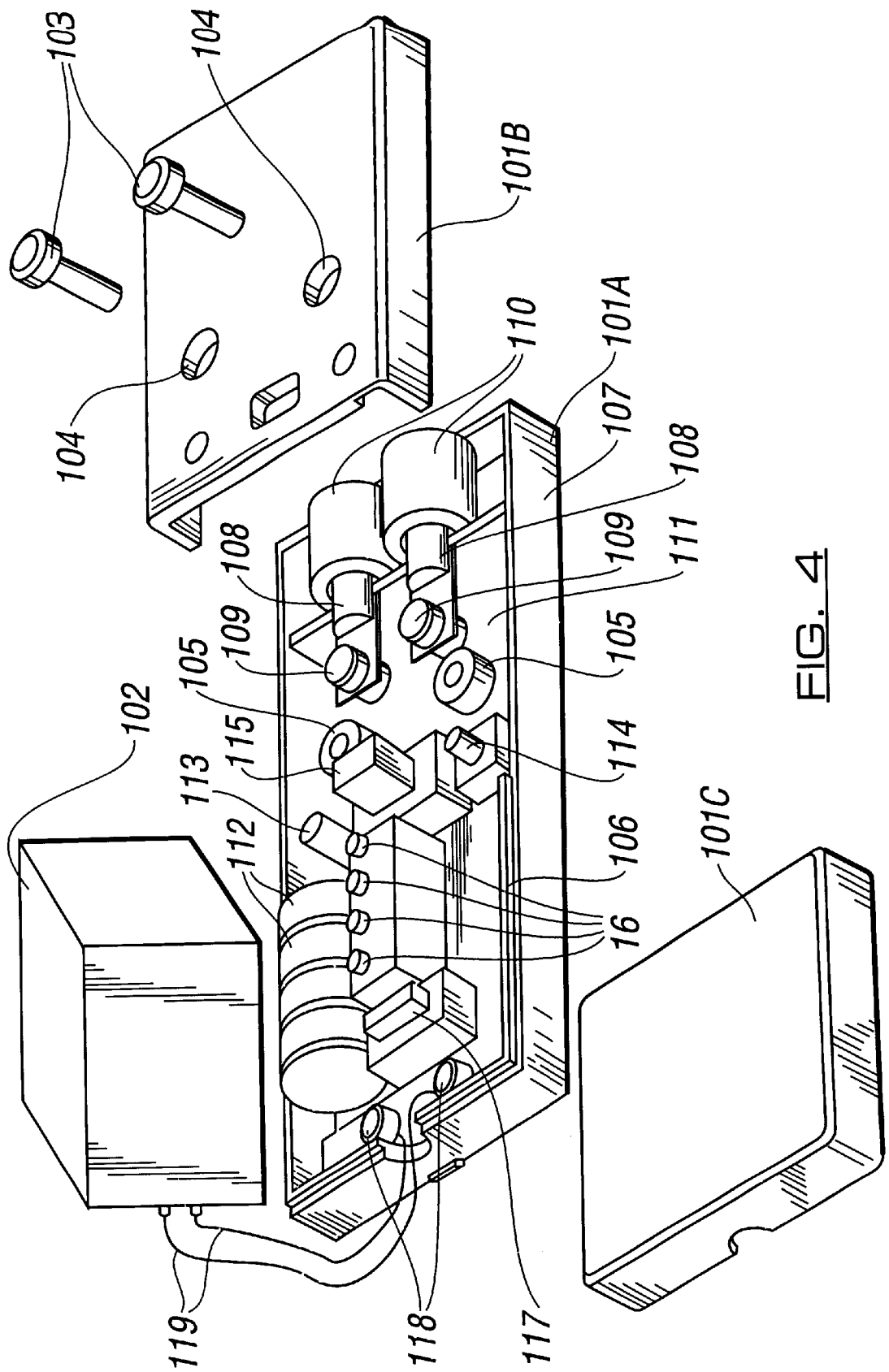
FIG. 4 is a composite perspective view of a cold junction compensator module for use in association with a thermocouple, and incorporating ferrite sleeves to provide shielding from stray electromagnetic interference.
Figure 5:
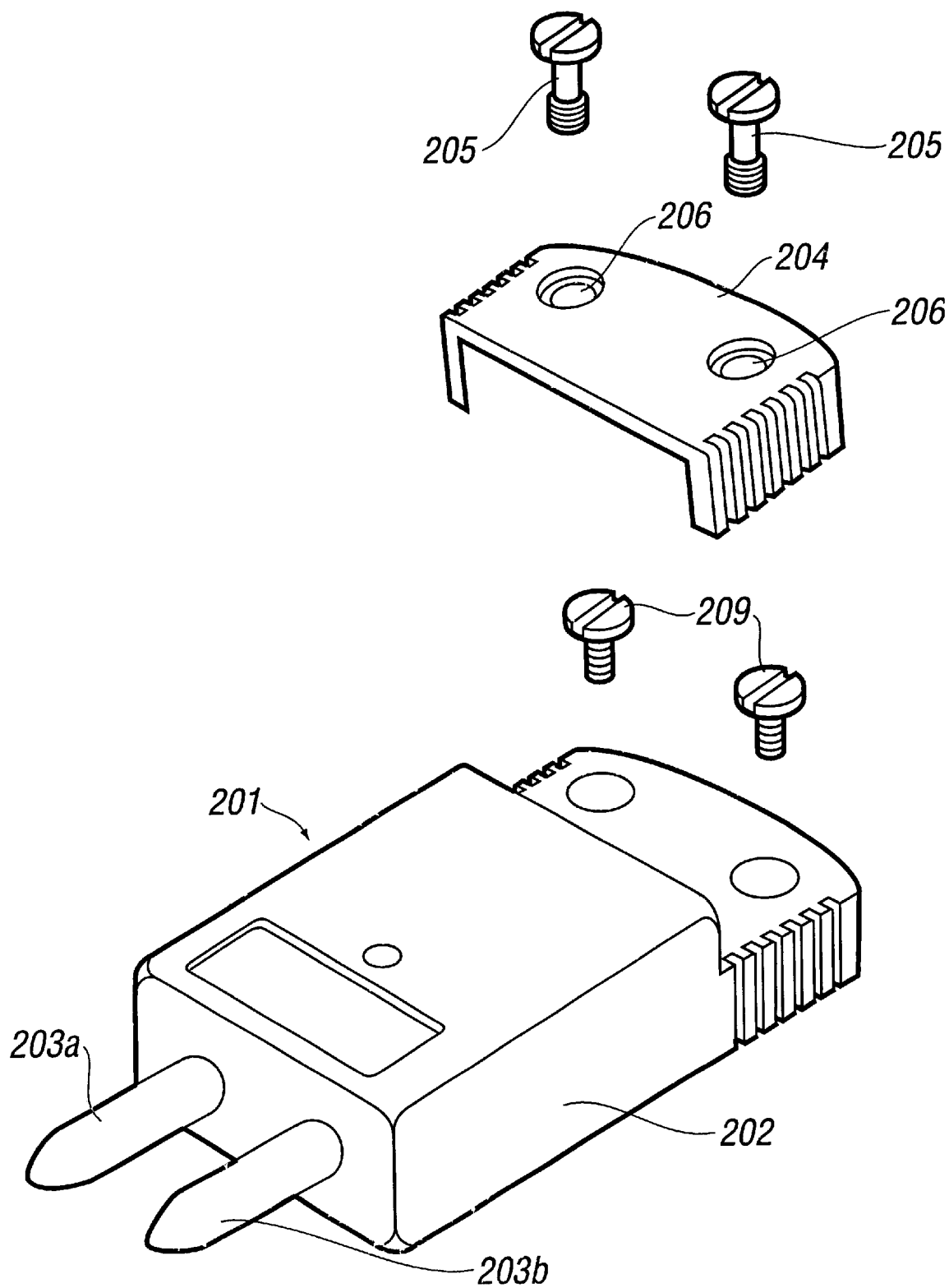
FIG. 5 is a perspective elevation, with parts shown in separated condition, of a two-pin male, plug suitable for connecting a lead (not shown) to a female socket provided, say, on another lead or on an article of apparatus, e.g. a thermoelectric device such as a thermocouple.
Figure 7:
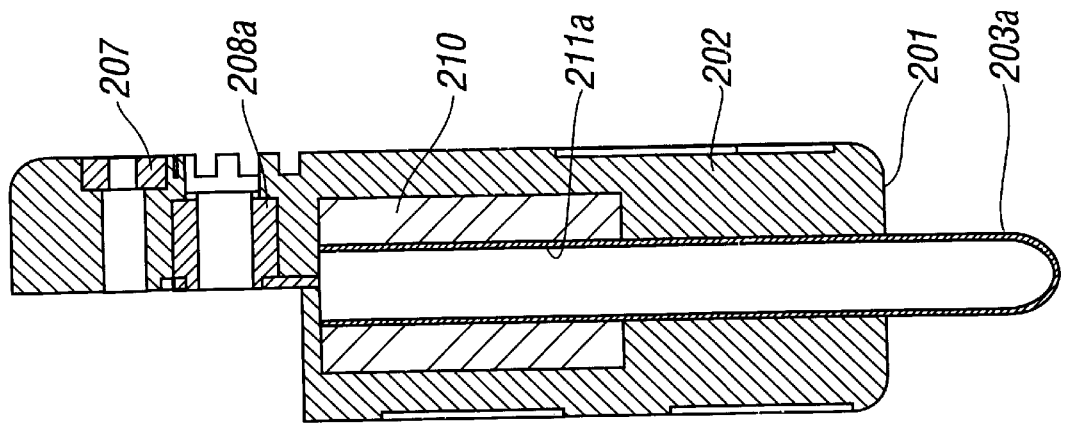
FIG. 7 is a section, taken, of the plug of FIGS. 5 and 6, with a cover portion omitted.
Figure 6:
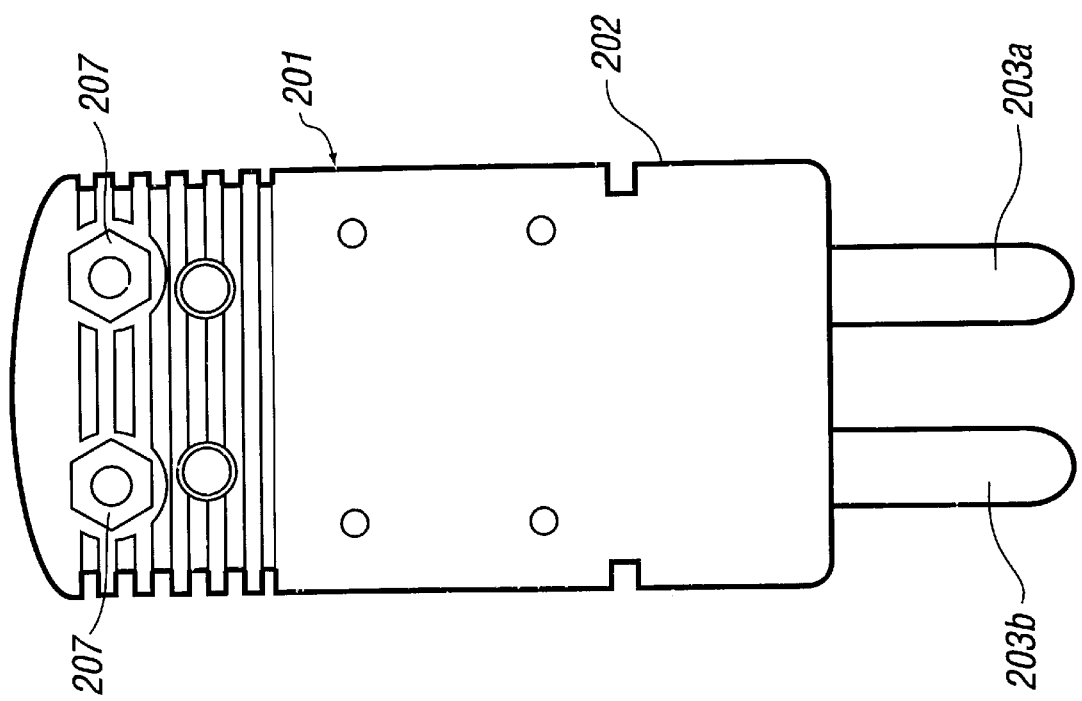
FIG. 6 is an underplan view of the plug of FIG. 5.
Figure 9:
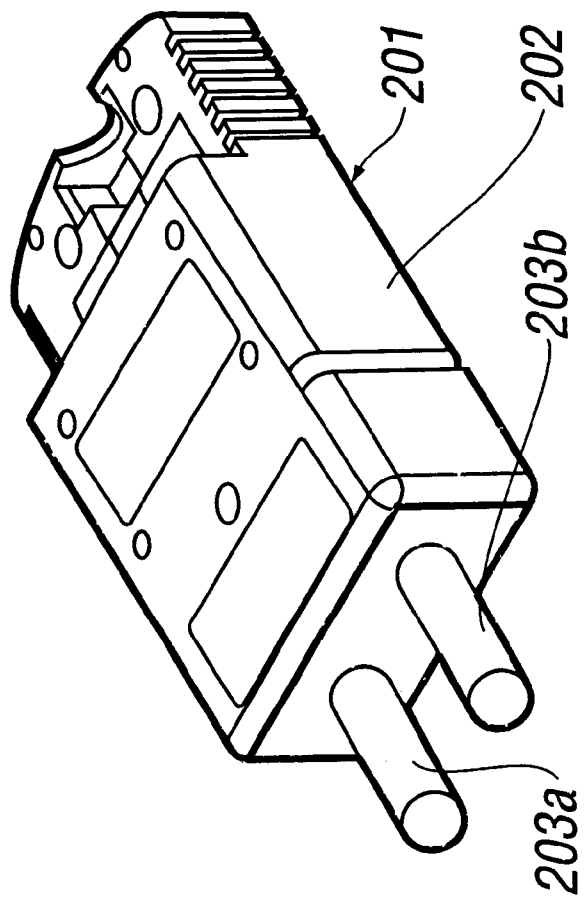
FIGS. 8 and 9 are respectively perspective views, of the plug of FIGS. 5 and 6, seen from different angles, and with the cover portion omitted.
Figure 8:
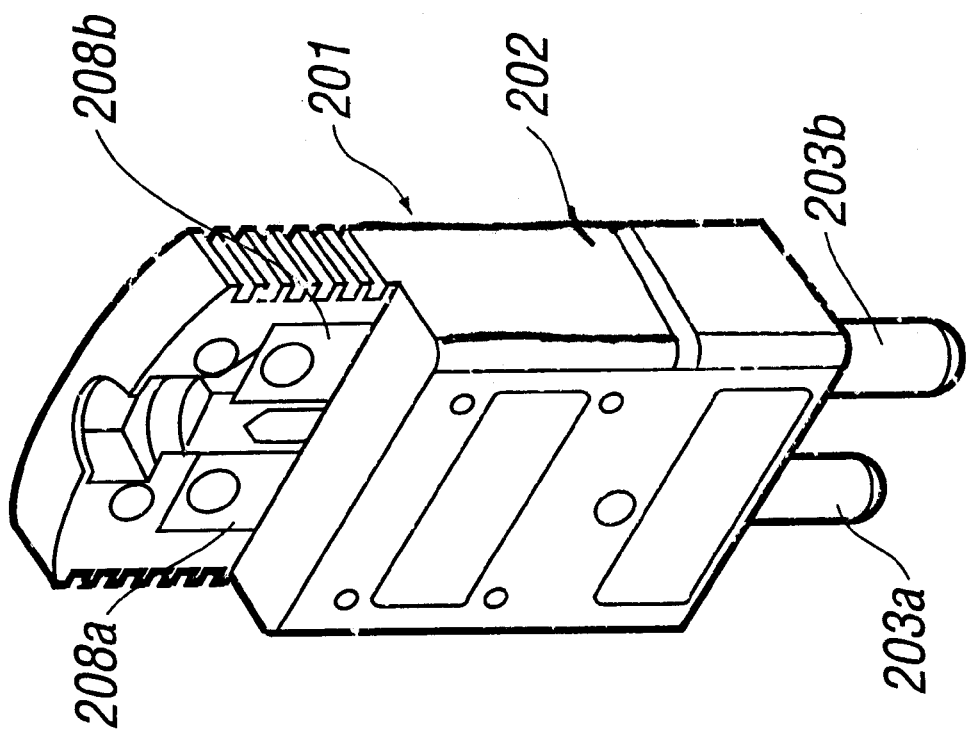

Referring to FIG. 4 of the drawing, a cold junction compensator module composts a base 101A, a first cover portion 101B, and a second cover portion 101C. A volt, or other, meter and/or a recording device, is denoted by reference 102.

The cover portion 101B can be secured in position on the base 101A by two screws 103 which pass through holes 104 in the cover portion 101B and engage threaded bosses 105 of the base 101A. The cover portion 101B can be secured on the base 101A by any conventional means, for example by making a sliding fit on side wall ribbing 106 which may be appropriately undercut.

The base 101A has an encircling wall 107 which is cut away (not shown) at the right-hand in this figure to permit access of two differently-sized male plug pins of a thermoelectric device to appropriate female sockets 108 mounted on respective terminal posts 109 secured on the base 101A. Each female socket 108 is surrounded by a respective ferrite sleeve 110 to provide shielding from stray electomagnetic interface.

Within the base 101A there is secured a printed circuit board 111 having appropriate circuitry for a compensation and linearization circuit. Also on the board there is provided means for mounting batteries 112 supplying power to the circuitry. A 'battery status' indicator (L.E.D) 113 can be brought into use when required by means of a battery status switch 114. A main on-off switch for the circuitry is shown at 115. Potentiometers 116 allow for calibration of the circuitry. A switch 117 permits changing of the output of the module to read in terms of degrees Centigrade or degrees Fahrenheit, as the case may be. Output terminals 118 can be connected by respective leads 119 to the meter or recording device 102.

The structure described with reference to FIG. 4 is disclosed in our co-pending U.S. patent application Ser. No.: 60/036624, Filed Jan. 31, 1997.

Referring to FIGS. 5, 6, 8, 9, and 10 of the drawings, there is shown a male plug 201 having a body 202 serving as a mounting for pins 203a and 203b of respectively different diameters, so as to ensure that the plug can be interconnected with a socket only in the correct position of polarity. A removable cover 204 can be in position on the plug body 202 by means of fixing screws 205 passed through holes 206 in the cover 204 and engaging into threaded fixtures 207 in the body 202. In the body 202, at a position below the cover 204 when it is attached, there are provided threaded terminals 208a and 208b to which wire leads can be attached by screws 209. The terminals form part of the respective pins 203a and 203b.

Within the body 202 there are housed two longitudinally split spaced apart blocks 210 of ferrite material. The block 210 are provided with through passages 211a, 211b of respectively different diameters to permit mounting through each block of the two pins 203a, 203b of the plug. Accordingly, each of the conductors (pins 203a, 203b) of the plug is totally surrounded by the ferrite material, and each block 210 can readily be made of suitably large dimensions to ensure that proper shielding is obtained.

According to a further aspect of the present invention, protection by ferrite material is obtained by providing individual separate shields for each of the pins, sockets, or other items, and in a preferred form such shields are annular and of rectangular, circular, tubular or toroidal shape and are of circular, rectangular, ovoid or other desired transverse cross-section, e.g. of the nature of washers, donut rings, or similar.

Figure 11:
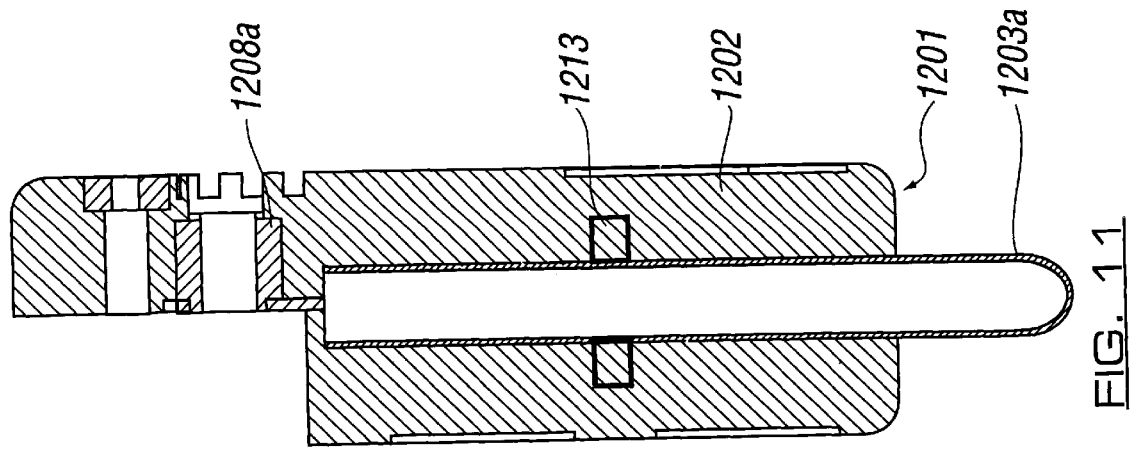
FIGS. 10 and 11 show a further embodiment, with a cover portion omitted, FIG. 10 being a union through a plug, taken in a first plane, and FIG. 11 being a section through the plug taken in a second place at a right angle to the section of FIG. 10.
Figure 10:
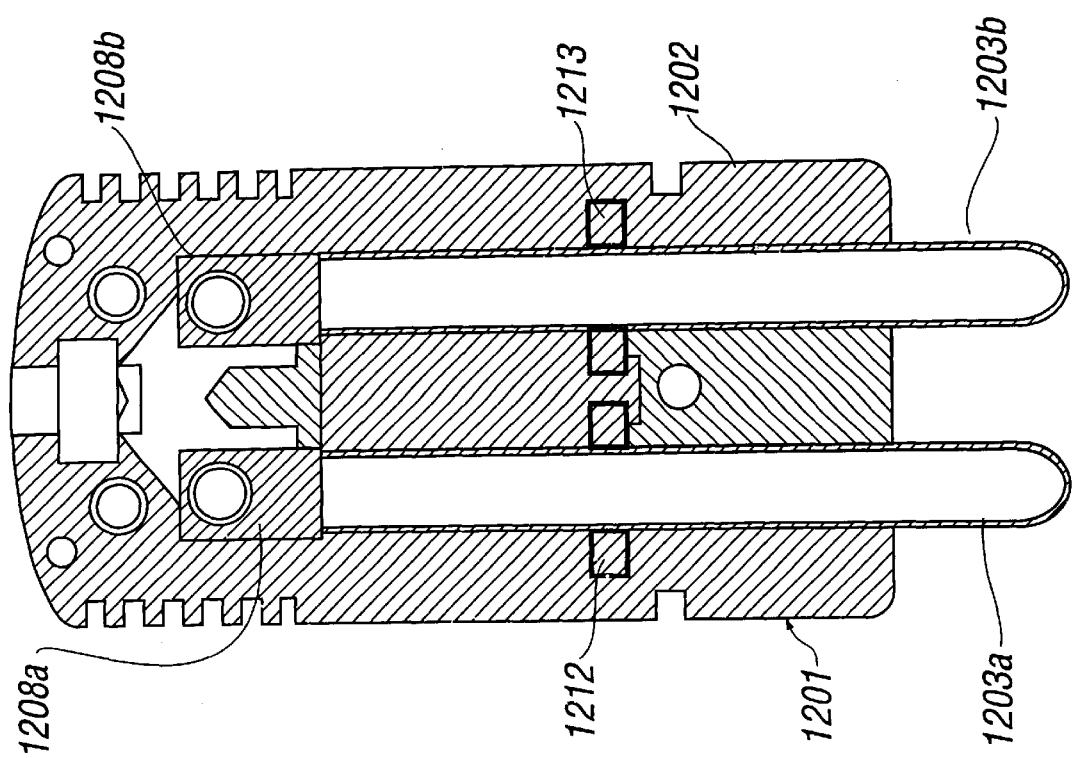

Referring to FIGS. 11. and 12, there is shown a male plug 1201 having a body 1202 serving as a mounting for pins 1203a and 1203b of respectively different diameters, so as to ensure that the plug can be interconnected with a socket only in a correct position of polarity. In the body 1202 there are provided threaded terminals 1208a and 1208b to which wire leads can be attached by screws (now shown). The terminals form part of the respective pins 1203a and 1203b. Within the body 1202 there are housed spaced apart rings 1212 and 1213 of ferrite material respectively disposed round the pins 1203a and 1203b. Accordingly each of the pins 1203a and 1203b is totally surrounded by ferrite material at a zone along its length, and the rings 1212 and 1213 can be readily made of greater or lesser axial dimension and/or radial dimension, and transverse cross-section, to ensure proper shielding is obtained.

It is known in the art that ferrite material has a "Curie Point" in the neighborhood of 500 degrees Fahrenheit at which point it changes its nature from insulator to conductor. Accordingly if only a single block of ferrite material is used to surround two or more conductors, there would be a risk of short-circuiting if the Curie Point was reached during use, whereas with the individual rings of FIGS. 11 and 12, this risk is avoided.

The structure described with reference to FIGS. 5, 6, 8, 9, and 10 of the drawings is disclosed in our co-pending U.S. patent application Ser. No.: 60/051055, Filed Jun. 27, 1997.

We claim:

1. An electrical connector, for a thermocouple, comprising: within an electrically insulating housing, at least two spaced apart apertured blocks of ferrite material, each block having an aperture therethrough of a different diameter from the other block; at least two elongate metallic conductors, each composed of a different metal and each of a different diameter and carried, by each body through which each is positioned in each aperture to project from each block of ferrite material.

2. An electrical connector, for a thermocouple, as claimed in claim 1, wherein said blocks of ferrite material are housed within said body.

3. An electrical connector, for a thermocouple, as claimed in claim 1, wherein said ferrite blocks are of elongate parallelpipedal form with each said metallic conductor positioned along and within the elongation of said ferrite block.

4. In combination, an electrical connector as claimed in claim 1, cable means coupled to said electrical connector, and a thermoelectric device engaged with said electrical connector.

5. An electrical connector, for a thermocouple, as claimed in claim 1, wherein to receive said conductor, and each said ferrite block has a through passage of cross-section corresponding to the cross-section of said conductor and dimensioned to form a clearance fit on said conductor.

6. An electrical conductor, for a thermocouple, as claimed in claim 5, wherein the cross-section of said through passage and of said conductor is circular.

7. An electrical conductor, for a thermocouple, as claimed in claim 5, where in said conductor is formed as a strip of greater width than thickness, and wherein said through passage of said ferrite block has a corresponding cross-section to receive said strip with clearance.

8. An electrical connector, in combination with a thermoelectric device, said connector comprising a body of electrically insulating material, a plurality of elongate metallic conductors each of a different metal and of a different diameter carried by said body, and a respective block of ferrite material carried by said body for each said conductor, each conductor projecting through and projecting from its respective block of ferrite material.

9. An electrical connector, as claimed in claim 8, wherein said elongate metallic conductors are respectively of different cross-sectional shape one from another.

10. An electrical connector, as claimed in claim 8, wherein said elongate metallic conductors are respectively of different cross-sectional dimension one from another.

11. An electrical connector as claimed in claim 8, wherein said elongate metallic conductors are respectively formed of metals of different alloy designation.

12. In combination of claim 7 having cable means coupled to said electrical connector.

13. The method of making an electrical connector, for a thermoelectric device, which comprises:
    (i) providing a body of electrically insulating material;
    (ii) providing at least two aperture blocks of ferrite material within said body;
    (iii) providing an elongate metallic conductor within each said block each conductor of a different metal and of a different diameter and positioned through and projecting from each said block of ferrite material.

14. The method of making an electrical connector, for a thermoelectric device, which comprises:
    (i) providing a pair of elongate metallic conductors respectively of metals of different alloy designations and of different diameter;
    (ii) providing a pair of apertured blocks of ferrite material spaced apart;
    (iii) positioning each said elongate metallic conductor through, and projecting at each end from, a respective one of said blocks of ferrite material, to form a respective conductor and block assembly.

* * * * *